(12) United States Patent
Günther et al.

(10) Patent No.: US 10,662,800 B2
(45) Date of Patent: May 26, 2020

(54) GAS TURBINE

(71) Applicant: MAN DIESEL & TURBO SE, Augsburg (DE)

(72) Inventors: Christian Günther, Dinslaken (DE); David Kluβ, Oberhausen (DE); Jaman El Masalme, Hamminkeln (DE)

(73) Assignee: MAN Energy Solutions SE, Augsburg (DE)

( * ) Notice: Subject to any disclaimer, the term of this patent is extended or adjusted under 35 U.S.C. 154(b) by 232 days.

(21) Appl. No.: 15/873,430

(22) Filed: Jan. 17, 2018

(65) Prior Publication Data

US 2018/0209293 A1    Jul. 26, 2018

(30) Foreign Application Priority Data

Jan. 23, 2017    (DE) .......................... 10 2017 101 161

(51) Int. Cl.
| | | |
|---|---|---|
| *G01K 1/00* | (2006.01) | |
| *G01K 7/00* | (2006.01) | |
| *F01D 17/08* | (2006.01) | |
| *F01D 25/30* | (2006.01) | |
| *F02C 9/28* | (2006.01) | |
| *G01K 1/14* | (2006.01) | |
| *G01K 13/02* | (2006.01) | |

(52) U.S. Cl.
CPC .......... *F01D 17/085* (2013.01); *F01D 25/30* (2013.01); *F02C 9/28* (2013.01); *G01K 1/14* (2013.01); *G01K 13/02* (2013.01); *F05D 2220/32* (2013.01); *F05D 2270/303* (2013.01); *F05D 2270/80* (2013.01); *G01K 2013/024* (2013.01); *G01K 2205/04* (2013.01)

(58) Field of Classification Search
USPC ................................ 374/144, 166, 208, 148
See application file for complete search history.

(56) References Cited

U.S. PATENT DOCUMENTS

| | | | |
|---|---|---|---|
| 8,714,906 B2* | 5/2014 | Morgan ................... | F02C 7/18 415/115 |
| 2002/0083372 A1* | 6/2002 | Adam ................ | G05B 23/0248 714/37 |
| 2011/0056181 A1* | 3/2011 | Dinu ........................ | F02C 9/54 60/39.27 |
| 2017/0219211 A1* | 8/2017 | Kajimura .................. | F02C 7/18 |
| 2019/0242581 A1* | 8/2019 | Abe ........................ | F23R 3/343 |

FOREIGN PATENT DOCUMENTS

| | | |
|---|---|---|
| EP | 1198739 | 4/2002 |
| WO | WO 01/09694 | 2/2001 |

* cited by examiner

*Primary Examiner* — Mirellys Jagan
(74) *Attorney, Agent, or Firm* — Cozen O'Connor

(57) ABSTRACT

A gas turbine with a compressor, in which air can be compressed; with at least one burner having a combustion chamber, which can be supplied with the compressed air and in which a fuel can be combusted in the presence of the compressed air subject to heating the air; a turbine, in which the heated air can be expanded; a diffuser arranged, seen in flow direction of the expanded air, downstream of the turbine; a plurality of temperature sensors, dependent on the measurement values of which a thermodynamic mean temperature or mixed-out turbine outlet temperature of the expanded air can be determined. The temperature sensors are arranged in the region of a diffuser cover, which at an outlet end of the diffuser closes off a hollow space of the diffuser positioned radially inside of a flow duct of the diffuser.

15 Claims, 2 Drawing Sheets

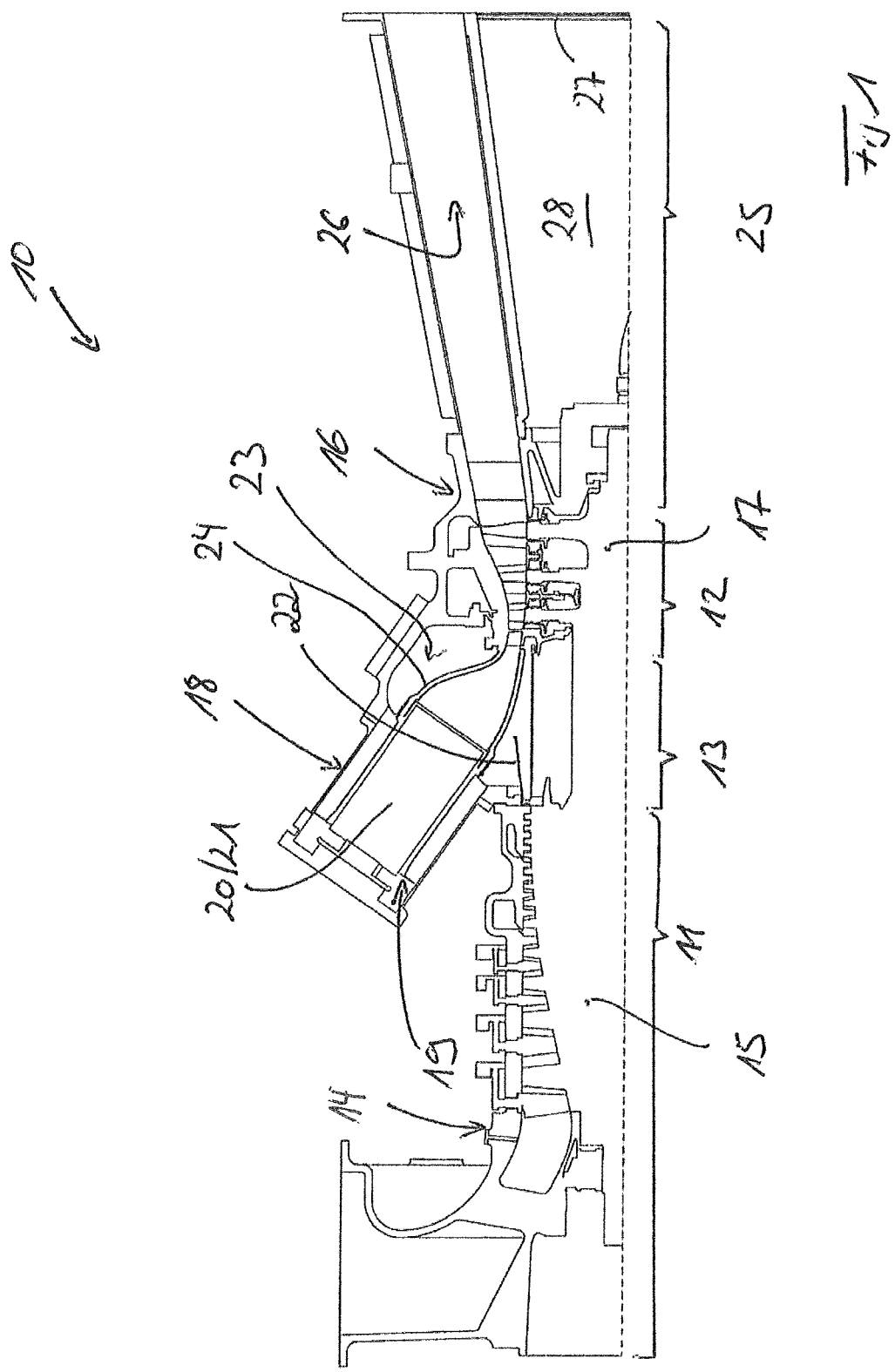

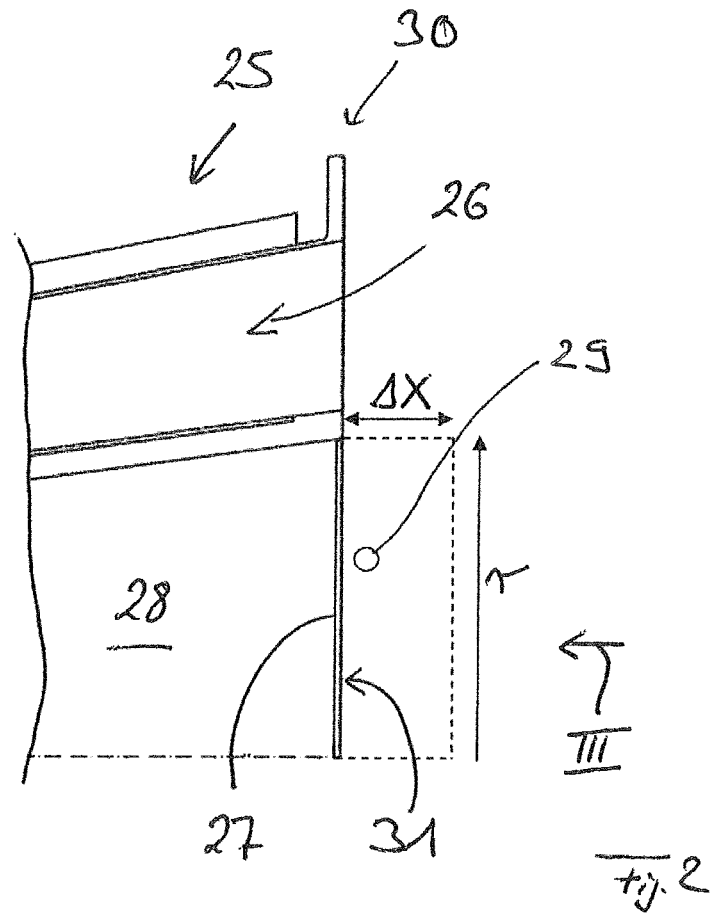
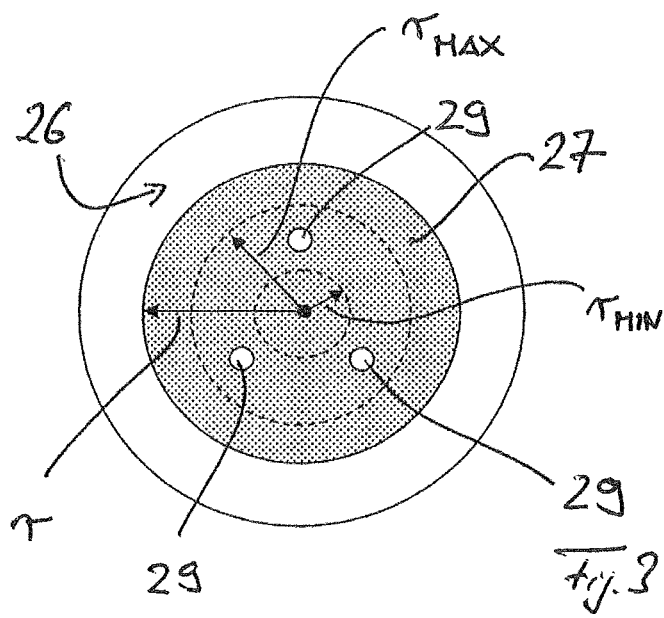

GAS TURBINE

BACKGROUND OF THE INVENTION

1. Field of the Invention

The invention relates to a gas turbine.

2. Description of the Related Art

The fundamental construction of a gas turbine, such as for example an industrial gas turbine, is known in principle to the person skilled in the art addressed here. A gas turbine comprises a compressor, a burner comprising at least one combustion chamber, and a turbine. In the compressor, an air flow is compressed. The compressed air flow can be fed to the or each combustion chamber of the gas turbine. In the or each combustion chamber of the gas turbine, a fuel is combusted in the presence of the compressed air, as a result of which the air is heated. Starting out from the or each combustion chamber of the turbine, the heated air can be fed to the gas turbine, wherein the heated air is expanded in the turbine. The work performance of such a gas turbine is then obtained from the difference of the power output by the turbine and consumed by the compressor. This difference materialises through the energy input in the or each combustion chamber of the burner.

Gas turbines known from practice comprise, furthermore, a diffuser, which seen in flow direction of the expanded air, is arranged downstream of the turbine. For regulating and/or controlling the operation of a gas turbine it is important to determine a so-called thermodynamic mean temperature of the expanded air, which is also described as mixed-out turbine outlet temperature, wherein for this purpose with gas turbines known from practice a plurality of temperature sensors are employed, which are positioned downstream of the turbine and if required upstream of the diffuser in the region of an annular flow duct for the expanded air.

Here there is the problem that over the circumference and the duct height of the flow duct substantial temperature gradients can occur, as a result of which it is required to arrange a multiplicity of temperature sensors over the circumference and the duct height of the flow duct and then determine the thermodynamic mean temperature or the mixed-out turbine outlet temperature of the expanded air with the help of a model of the measurement values detected by the temperature sensors. However, this is not only expensive but dependent on the number of temperature sensors also error-prone.

SUMMARY OF THE INVENTION

There is a need for a gas turbine in the case of which the thermodynamic mean temperature or the mixed-out turbine outlet temperature of the expanded air can be determined more precisely with less expenditure. Starting out from this, one aspect of the invention is based on creating a new type of gas turbine. The temperature sensors are arranged in a region of a diffuser cover, which at an outlet end of the diffuser, closes off a hollow space positioned radially inside of a flow duct of the diffuser of the same. The arranging of the temperature sensors in the region of the diffuser cover, which at the outlet end of the diffuser closes off a hollow space radially inside of the flow duct of the diffuser of the same, utilises a separation of the flow downstream of the diffuser. Temperature sensors positioned in this region can determine the thermodynamic mean temperature or the mixed-out turbine outlet temperature of the expanded air with little expenditure and precisely.

Preferentially, the temperature sensors seen in flow direction of the expanded air are arranged on a downstream side of the diffuser cover, wherein the temperature sensors are directly arranged on this side of the diffuser cover or have a distance of maximally 50 cm, preferably of maximally 40 cm, particularly preferably of maximally 30 cm from this side of the diffuser cover. In particular when the temperature sensors are positioned in this region, the thermodynamic mean temperature or the mixed-out turbine outlet temperature of the expanded air can be particularly advantageously determined.

According to an advantageous further development, the temperature sensors, seen in an axial projection, are arranged within a region that is defined by a circumference of the diffuser cover, preferentially in a circular ring region, which on the inside is defined by an inner radius and on the outside by an outer radius. The inner radius in particular amounts to between 5% and 45%, preferably between 10% and 40%, particularly preferably between 20% and 30% of the radius of the diffuser cover. The outer radius in particular amounts to between 55% and 95%, preferably between 60% and 90%, particularly preferably between 70% and 80% of the radius of the diffuser cover. This region is preferred for the positioning of the temperature sensors in order to determine the thermodynamic mean temperature or the mixed-out turbine outlet temperature of the expanded air.

According to an advantageous further development, the temperature sensors, preferentially three temperature sensors, are positioned seen in an axial projection equally distributed on a contour of a circle. The use of three temperature sensors is preferred to determine defective temperature sensors by way of a cross-comparison of the measurement values of the temperature sensors.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Preferred further developments of the invention are obtained from the subclaims and the following description. Exemplary embodiments of the invention are explained in more detail by way of the drawing without being restricted to this. There it shows:

FIG. 1 is a gas turbine in cross section;
FIG. 2 is a detail of FIG. 1; and
FIG. 3 is the detail of FIG. 2 in viewing direction III.

DETAILED DESCRIPTION OF THE PRESENTLY PREFERRED EMBODIMENTS

FIG. 1 shows an axial section through a gas turbine 10 in a region of a compressor 11, a turbine 12, and a burner 13 comprising at least one combustion chamber, connected between the compressor 11 and the turbine 12. For the compressor 11, a stator-side housing 14 and a rotor-side shaft 15 with a plurality of compressor stages are shown. For the turbine 12, a stator-side housing 16 and a rotor-side shaft 17 with a plurality of turbine stages are shown. The rotor-side shaft 15 of the compressor 11 and the rotor-side shaft 17 of the turbine 12 are coupled to one another.

For the burner 13, a burner housing 18 is shown, which is connected between the stator-side housing 14 of the compressor 11 and the stator-side housing 16 of the turbine 12. Preferentially, the burner housing 18 comprises a plurality of recesses 19. Each recess 19 receives at least one flame tube 20 of a respective combustion chamber 21 in each case. These recesses 19, for receiving the flame tubes 20, are arranged over the circumference of the burner housing 18 preferentially equally distributed seen in circumferential direction.

The compressor 11 serves for compressing an air flow. The compressed air flow leaves the compressor 11 via a diffuser 22 and via diffuser 22 enters an annular flow duct 23, which is provided by the burner housing 18.

Starting out from this annular flow duct 23 of the burner housing 18, the compressed air enters the region of each combustion chamber 21 and thus the region of each flame tube 20, wherein in the region of the respective combustion chamber 21 a fuel is combusted and the air heated in the process.

From the respective combustion chamber 21, the heated air is fed to the turbine 12, wherein intermediate pieces 24 serve for this purpose. From each combustion chamber 21, the heated air can be fed to the turbine 12 of the gas turbine 10 via an intermediate piece 24 in each case.

In the region of the turbine 12 of the gas turbine 10, the heated air is expanded. Downstream of the turbine 12 a diffuser 25 is arranged via which the expanded air is conducted downstream of the turbine 12. The diffuser 25 comprises an annular flow duct 26, wherein radially inside of this flow duct 26 a hollow space 28 that is separated from the flow duct 26 is arranged, which at a downstream end of the diffuser 25 is closed off by a diffuser cover 27.

As shown in FIG. 2, gas turbine 10 comprises a plurality of temperature sensors 29, wherein as a function of the measurement values of the temperature sensors 29 a thermodynamic mean temperature or mixed-out turbine outlet temperature of the expanded air is determined. According to one aspect of the invention, the temperature sensors 29 are arranged in the region of the diffuser cover 27 which, as already explained, closes off the hollow space 28 of the diffuser 25 positioned radially inside of the flow duct 26 of the diffuser 25 at an outlet-side end 30 of the diffuser 25.

Here, the temperature sensors 29 are arranged, seen in flow direction of the expanded air, downstream of the diffuser cover 27, namely on or adjacent to a downstream side 31 of the diffuser cover 27.

Here, the temperature sensors 29 can be directly arranged on this downstream side 31 of the diffuser cover 27 but it is likewise possible that the temperature sensors 29 have a distance $\Delta X$ from this downstream side 31 of the diffuser cover 27 which amounts to maximally 50 cm, preferably maximally 40 cm, particularly preferably maximally 30 cm.

Seen in the axial projection, the temperature sensors 29 are positioned within a circumference of the diffuser cover 27 defined by the radius r of the diffuser cover 27.

Particularly preferably it is provided that the temperature sensors 29 are arranged as shown in FIG. 3 in a circular ring region which on the inside is defined by an inner radius $r_{MIN}$ and outside by an outer radius $r_{MAX}$. The inner radius $r_{MIN}$ amounts to between 5% and 45%, preferably between 10% and 40%, particularly preferably between 20% and 30% of the radius r of the diffuser cover 27. The outer radius $r_{MAX}$ amounts to between 55% and 95%, preferably between 60% and 90%, particularly preferably between 70% and 80% of the radius r of the diffuser cover 27.

In a particularly preferred embodiment it can be provided that the temperature sensors 29 are altogether positioned on a circular path the radius of which corresponds to 50% of the radius r of the diffuser cover 27.

Preferentially, three temperature sensors 29 are present which are positioned equally distributed on a contour of a circle or circular path, wherein the individual temperature sensors 29 then have an angular distance of 120° each relative to one another. In particular when three temperature sensors 29 are used, it can be easily determined if a temperature sensor 29 is defective by comparing the measurement values of each temperature sensor 29 with the other measurement values of the other temperature sensors 29.

It is possible to mount the temperature sensors 29 on the diffuser cover 27. Alternatively it is also possible to mount the temperature sensors 29 on a radially outer boundary wall, for example on the flow duct following the diffuser. The attachment is also possible on a radially inner boundary wall of the flow duct 28 of the diffuser 25.

With the present invention it is proposed to measure the thermodynamic mean temperature or mixed-out turbine outlet temperature of the expanded air with the help of temperature sensors 29 that are not positioned in the main flow duct of the turbine 12 or of the diffuser 25 but rather in a separation region of the flow downstream of the diffuser 25 or on a downstream end 30 of the diffuser 25 in the region of the diffuser cover 27. A good mixing-through of the expanded air is present there so that the thermodynamic mean temperature or mixed-out turbine outlet temperature of the expanded air can be precisely detected with a low number of temperature sensors 29. The temperature sensors 29 are located in a protected region and are thus protected against damage.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:
1. A gas turbine, comprising:
a compressor configured to compress air;
a burner comprising at least one combustion chamber, which can be supplied with the air compressed in the compressor and in which a fuel, in presence of the compressed air, can be combusted subject to heating the air;
a turbine configured to expand the heated air;
a diffuser having a flow duct and arranged downstream of the turbine seen in a flow direction of the expanded air;

a diffuser cover arranged at an outlet end of the diffuser that closes off a hollow space positioned radially inside of the flow duct of the diffuser; and a plurality of temperature sensors arranged in a region of the diffuser cover that each provide a measurement value from which a thermodynamic mean temperature or a mixed-out turbine outlet temperature of the expanded air can be determined.

2. The gas turbine according to claim 1, wherein the plurality of temperature sensors, seen in the flow direction of the expanded air, are arranged downstream of the diffuser cover.

3. The gas turbine according to claim 1, wherein when seen in an axial projection the plurality of temperature sensors are positioned evenly distributed on a contour of a circle.

4. The gas turbine according to claim 1, wherein three temperature sensors are arranged in the region of the diffuser cover.

5. The gas turbine according to claim 1, wherein the plurality of temperature sensors are mounted on the diffuser cover.

6. The gas turbine according to claim 1, wherein the plurality of temperature sensors are mounted on one of:
a radially outer boundary wall of the flow duct of the diffuser; and
a radially inner boundary wall of the flow duct of the diffuser.

7. The gas turbine according to claim 6, wherein the plurality of temperature sensors are mounted on the radially outer boundary wall of the flow duct following the diffuser, the radially outer boundary wall being in a form of a tube.

8. The gas turbine according to claim 1, wherein the plurality of temperature sensors, seen in the flow direction of the expanded air, are arranged on a downstream side of the diffuser cover.

9. The gas turbine according to claim 8, wherein the plurality of temperature sensors are directly arranged on the downstream side of the diffuser cover.

10. The gas turbine according to claim 8, wherein the plurality of temperature sensors have a distance from the downstream side of the diffuser cover,
wherein the distance is one of:
maximally 50 cm,
maximally 40 cm, and
maximally 30 cm.

11. The gas turbine according to claim 1, wherein when seen in an axial projection the plurality of temperature sensors are arranged within a circular region defined by a circumference of the diffuser cover.

12. The gas turbine according to claim 11, wherein the plurality of temperature sensors are arranged in the circular region, which on the inside is defined by an inner radius and on the outside by an outer radius.

13. The gas turbine according to claim 12, wherein the outer radius is at least one of:
between 55% and 95% of a radius of the diffuser cover,
between 60% and 90% of the radius of the diffuser cover, and
between 70% and 80% of the radius of the diffuser cover.

14. The gas turbine according to claim 12, wherein the inner radius is at least one of:
between 5% and 45% of a radius of the diffuser cover,
between 10% and 40% of the radius of the diffuser cover, and
between 20% and 30% of the radius of the diffuser cover.

15. The gas turbine according to claim 14, wherein the outer radius is at least one of:
between 55% and 95% of the radius of the diffuser cover,
between 60% and 90% of the radius of the diffuser cover, and
between 70% and 80% of the radius of the diffuser cover.

* * * * *